United States Patent [19]

Vogel et al.

[11] 4,304,344
[45] Dec. 8, 1981

[54] SPREADER FOR PARTICULATE MATERIAL

[75] Inventors: John D. Vogel, Sagamore Hills; Carl E. Bochmann, Cleveland, both of Ohio

[73] Assignee: O. M. Scotts and Sons Company, Marysville, Ohio

[21] Appl. No.: 107,021

[22] Filed: Dec. 26, 1979

[51] Int. Cl.$^3$ ............................................. A01C 15/02
[52] U.S. Cl. ................................... 222/614; 222/456
[58] Field of Search .............. 222/613, 614, 609, 167, 222/169, 170, 171, 172, 456; 221/186

[56] References Cited

U.S. PATENT DOCUMENTS

| | | | |
|---|---|---|---|
| 677,612 | 7/1901 | Alexander | 222/169 X |
| 1,862,347 | 6/1932 | Hawks | 222/169 X |
| 2,315,022 | 3/1943 | Smith | 222/169 X |
| 2,861,719 | 11/1958 | Trotter | 222/169 X |

Primary Examiner—Stanley H. Tollberg
Attorney, Agent, or Firm—James B. Raden; Harold J. Holt

[57] ABSTRACT

A spreader for distributing particulate material, particularly adapted for use as both a package for particulates and as a disposable spreader, comprises a dispenser, a pair of wheels mounted at opposite ends of the dispenser and a handle for advancing the spreader along a given path as the dispenser rotates. The dispenser has inner and outer chambers, the inner chamber adapted to act as a reservoir for particulate material, the outer chamber adapted to provide a circumferential passageway for particulate material passing from the inner chamber to the exterior of the spreader. A one-way valve arrangement in the passageway restricts particulate flow to the exterior when the dispenser is rotated in one direction but permits flow when rotated in the opposite direction.

6 Claims, 5 Drawing Figures

SPREADER FOR PARTICULATE MATERIAL

This invention relates to a spreader for distributing particulate material, to a dispenser for use in said spreader and more specifically to a disposable spreader in which the dispenser is used for both spreading particulate and as a container for packaging particulate material.

Spreaders for distributing fertilizers, pesticides, seeds and other particulate or finely divided material to the soil or to vegetation are widely used today. It has long been desired to provide an inexpensive spreader, particularly for use on turf, which is disposable but yet effective for the uniform distribution of particulates.

It is a primary object of the present invention to provide a spreader for particulate material which because of its low cost may be disposed of after use but which is effective for the uniform distribution of particulate material to the soil or to vegetation.

It is an additional object of this invention to provide a spreader having a rotatable dispenser which dispenses particulates only when the spreader is advanced in a forward direction.

It is still an additional object of this invention to provide a disposable dispenser for a spreader, which dispenser may also be used as a container for packaging fertilizer or other particulates.

The foregoing and other objects of the invention are achieved in a spreader, the dispenser of which is in the form of an elongated body adapted for rotation about its axis and having inner and outer concentric chambers in fixed relationship to each other, said chambers in turn being defined by spaced inner and outer concentric walls, each wall having a series of spaced openings therein, the inner chamber adapted to act as a reservoir for particulate material, the outer chamber adapted to provide a circumferential passageway for particulate material entering therein from the inner chamber through the spaced openings in the outer wall, one-way valve means within said passageway and in association with the openings in said inner and outer walls adapted to restrict the flow of particulate material from said dispenser to the exterior upon rotation of the dispenser in a first direction, said valve means adapted to permit flow of particulate material through said passageway to the exterior upon rotation of the dispenser in the opposite direction.

The invention will be better understood by reference to the accompanying drawing in which.

Figure 1:
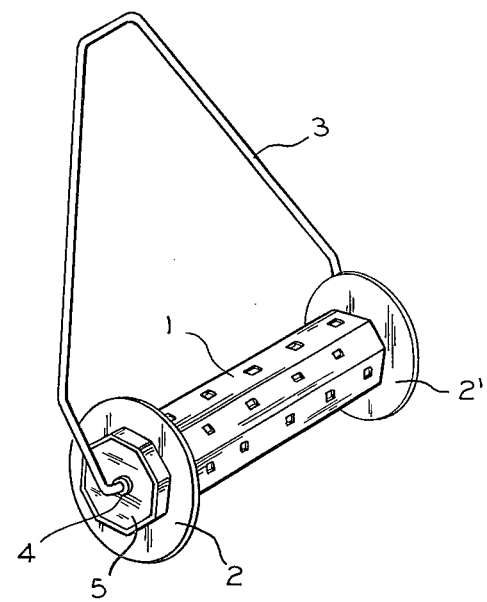
FIG. 1 is a perspective view of one embodiment of the spreader of the invention.

The spreader comprises a dispenser body 1 in the form of an elongated drum-shaped body adapted for rotation about its axis, a pair of wheels 2 and 2' mounted at opposite axial ends of the dispenser and a wiere handle 3 for manually advancing the spreader along a given direction. The wire handle 3 is mounted by spring fit in an end plug 4 in the central portion of an end wall 5 of the dispenser, only one of two identical end walls in which it is mounted, being shown in the drawing.

Figure 2:
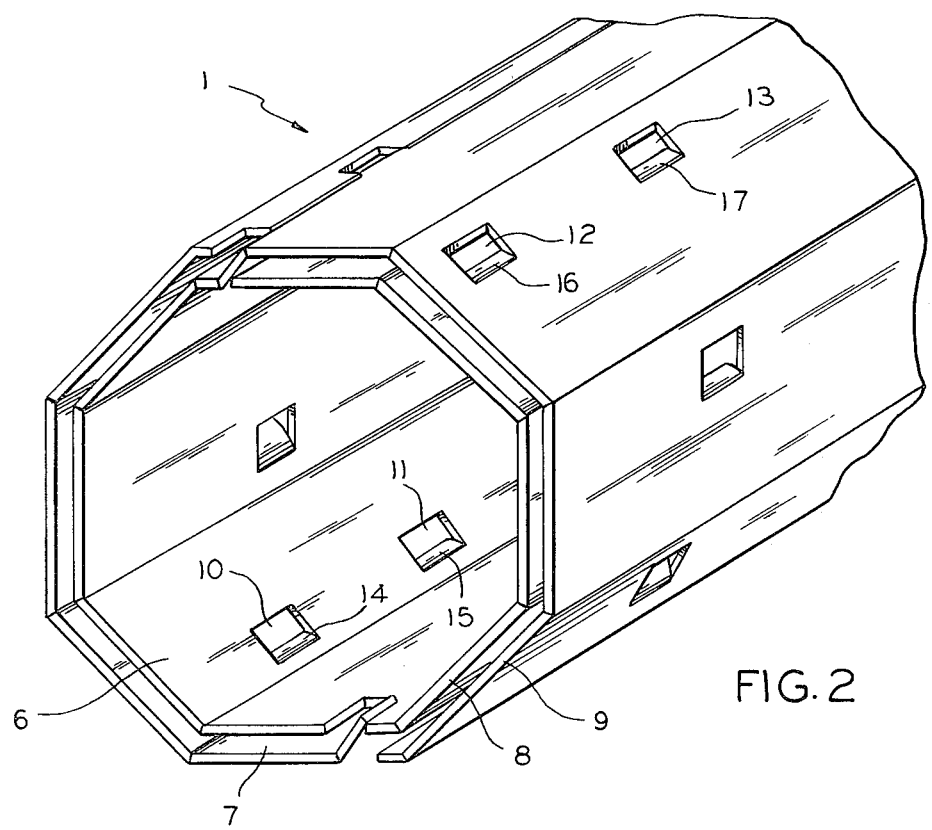
FIG. 2 is a perspective view on a larger scale of a portion of the dispenser body of the spreader of FIG. 1 with the end wall removed.
Figure 3:
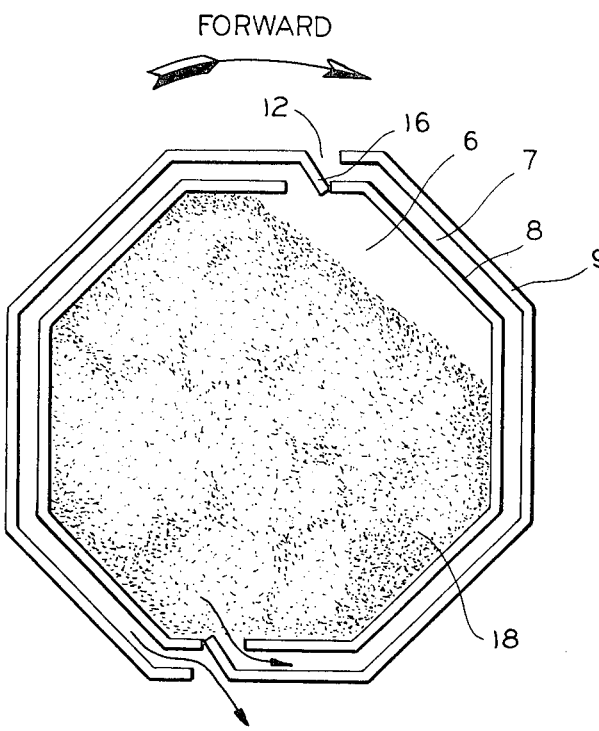
FIGS. 3 and 4 are radial cross sectional views showing the flow of particulate material in the dispenser as it is rotated.
Figure 4:
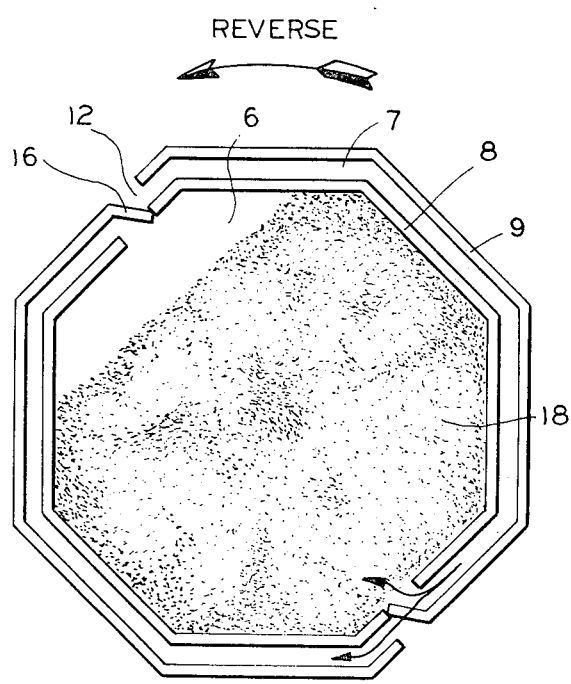

The dispenser is of uniform radial cross sectional shape-in the drawing, this shape being shown as octagonal, although other polygonal or even circular cross sectional shapes could be used. As shown in FIGS. 2-4, the dispenser comprises an inner chamber 6 and an outer concentric chamber 7 in fixed relationship to each other. The chambers are in turn defined by an inner wall 8 and an outer concentric wall 9. Each of walls 8 and 9 has a series of spaced openings, as for example 10 and 11 in the inner wall and 12 and 13 in the outer wall, arranged circumferentially in a regular pattern around the walls. The openings in the outer wall are in substantial registry with the corresponding openings in the inner wall. A ramp, for example, ramps 14, 15, 16 and 17, extends from a first side of each spaced opening in the outer wall to an opposite side of a spaced opening in substantial registry in the inner wall.

Inner chamber 6 acts as a reservoir for particulate material. Outer chamber 7 provides a circumferential passageway or raceway that allows particulate material to circulate in a consistent direction. Particulate material enters the raceway from the inner chamber 6 through spaced openings 10 and 11 in the inner wall and exits therefrom through spaced openings 12 and 13 in the outer wall. The ramp 12, in association with the openings, acts as a one-way valve within passgeway 7.

As particularly shown in FIGS. 3 and 4, upon rotation of the dispenser in a forward direction, the valve permits flow of particulates into the passageway from the inner chamber 6 and to the exterior from an opening in outer wall 9. Upon rotation of the dispenser in the reverse direction, the flow of particulate material is into the inner chamber from passageway 7 and flow to the exterior is substantially restricted.

Thus, this dispenser design, permitting constant flow around the raceway, allows the spreader to uniformly meter fertilizer or other particulate out in the forward direction and to prevent flow when the spreader is stopped or rotated in a reverse direction because the output openings are shaded by the ramps. The raceway design also enhances uniformity of distribution of particulate.

The design of the spreader is particularly adapted for manufacture from low cost construction materials, such as cardboard and for efficient use as a packaging material for shipping fertilizer, or other particulate material. This in turn makes the spreader useful as a disposable applicator for particulates. The dispenser body 1 may be made, for example, from two sheets of corrugated cardboard for inner and outer walls 8 and 9 having the required metering openings and ramps and from two cardboard inserts which seal the dispenser and form the end walls. Wheels 2 and 2' may similarly be constructed of corrugated cardboard and are of relatively large diameter both to keep the dispenser elevated from wet ground and to reduce the centrifugal force inside the dispenser.

Figure 5:
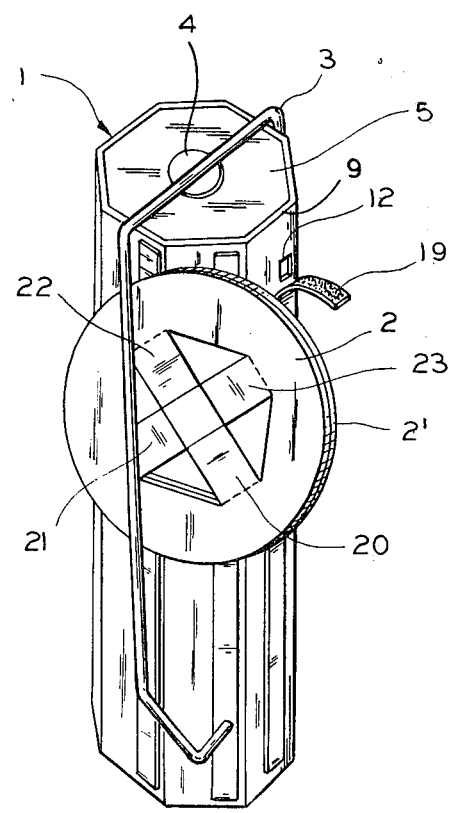
FIG. 5 is a perspective view of the dispenser, handle and wheels making up the spreader as the components would appear in a disposable package containing particulates.

One embodiment of a disposable spreader-fertilizer package is shown in FIG. 5. As there shown, the openings 12, 13, etc., in the outer wall 9 of the dispenser are sealed to contain the fertilizer within the dispenser by removable tear strips 19 for shipment and set up of the spreader. Wire handle 3 holds wheels 2 and 2' against the dispenser to form a compact package. Each of the wheels contains four tabs 20-23 which fold inwardly to create a hub so that the wheels can be slid onto the dispenser where they are held by friction fit. The arms of wire handle 3 are spread out for removal from the package and insertion into the end plugs where the arms spring inwardly to remain in place.

In the embodiment illustrated in the drawing, there are eight horizontal rows of openings—a row in each of the eight sides of the octagonal dispenser. The openings in each row are arranged in staggered formation with respect to the openings in an adjacent row. The openings are arranged to permit particulate to drizzle out in a uniform particulate pattern rather than pour out in isolated spots. The rate of flow is controlled by the width of the raceway 7 and the number and size of the openings. The rate of flow is thus determined by the spreader design and requires no adjustment by the user.

The spreader of the invention is useful, either as a disposable or reusable spreader, for the uniform distribution to the soil or to vegetation of a wide variety of particulates including fertilizers, pesticides, lime or other soil additives and seeds.

We claim:

1. A disposable spreader for distributing particulate material comprising a dispenser, said dispenser being in the form of an elongated body adapted for rotation about its axis and having inner and outer concentric chambers in fixed relationship to each other, said chambers in turn being defined by spaced inner and outer concentric walls, each wall having a series of openings therein spaced both circumferentially around and axially across said walls, each opening in said outer wall being in substantial registry with an opening in the inner wall, the inner chamber adapted to act as a reservoir for particulate material, the outer chamber adapted to provide a circumferential passageway for particulate material entering therein from the inner chamber through the spaced opening in the inner wall and exiting therefrom through the spaced openings in the outer wall, said circumferential passageway extending axially completely across said elongated body, one-way flow-restriction means within said passageway and in association with the openings in said inner and outer walls adapted to restrict the flow of particulate material from said dispenser to the exterior upon rotation of the dispenser in a first direction, said flow-restriction means adapted to permit flow of particulate material through said passageway to the exterior upon rotation of the dispenser in the opposite direction, a pair of wheels mounted at opposite axial ends of the dispenser and means for advancing the spreader along a given direction as the dispenser rotates.

2. The dispenser of claim 1 in which the elongated body is of substantially uniform cross sectional shape in its radial and axial planes.

3. The dispenser of claim 2 in which said cross sectional shape is polygonal.

4. A disposable spreader for distributing particulate material comprising the dispenser, wheels and advancing means of claim 1, in which the dispenser and wheels are made of cardboard and the wheels are friction mounted on the outer wall of the dispenser.

5. The disposable spreader of claim 1 in which the advancing means comprises a wire handle mounted by spring fit on opposite central ends of the dispenser.

6. A package for particulate material comprising the dispenser, pair of wheels and wire handle of claim 5, the dispenser containing particulate material in the inner chamber, the spaced openings in the outer wall being closed with removable closure means, said dispenser, wheels and wire handle together forming a complete spreader-fertilizer package.

* * * * *